(12) United States Patent
Fields et al.

(10) Patent No.: US 6,338,059 B1
(45) Date of Patent: Jan. 8, 2002

(54) HYPERLINKED SEARCH INTERFACE FOR DISTRIBUTED DATABASE

(75) Inventors: Duane Kimbell Fields, Austin; Sebastian Hassinger, Blanco; William Walter Hurley, II, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/213,914

(22) Filed: Dec. 17, 1998

(51) Int. Cl.[7] .............................................. G06F 17/30
(52) U.S. Cl. ..................... 707/4; 707/10; 707/104.1; 707/500.1
(58) Field of Search .............................. 707/4, 5, 9, 10, 707/102, 104, 516, 522, 530, 501; 709/203, 217, 219

(56) References Cited

U.S. PATENT DOCUMENTS

| | | | | |
|---|---|---|---|---|
| 5,848,424 A | * | 12/1998 | Scheinkman et al. | 707/501 |
| 5,907,837 A | * | 5/1999 | Ferrel et al. | 707/3 |
| 5,974,413 A | * | 10/1999 | Beauregard et al. | 707/6 |
| 5,982,370 A | | 11/1999 | Kamper | 345/356 |
| 6,012,071 A | * | 1/2000 | Krishna et al. | 707/522 |
| 6,098,081 A | * | 8/2000 | Heidorn et al. | 707/501 |
| 6,101,510 A | * | 8/2000 | Stone et al. | 707/513 |
| 6,128,655 A | * | 10/2000 | Fields et al. | 709/210 |
| 6,154,738 A | * | 11/2000 | Call | 707/4 |
| 6,189,019 B1 | * | 2/2001 | Blumer et al. | 707/513 |

OTHER PUBLICATIONS

"Roboword" by TechnoCraft (Product Information), pp. 1–3, Jul. 1997.*

* cited by examiner

*Primary Examiner*—Diane D. Mizrahi
(74) *Attorney, Agent, or Firm*—Jeffrey S. LaBaw

(57) ABSTRACT

Real time creation of new hyperlinks in a hyperlinked database is performed. Responsive to user input, a word or other element is selected in a first page of the hyperlinked database. The selected word is used as part of a search query to a selected search engine. The search results are received from the selected search engine and presented in a second page to a user. In one preferred embodiment, first and second pages are web pages presented by a browser and the selected search engine is an Internet search engine native to a different page than the server from which the first page originates.

14 Claims, 7 Drawing Sheets

HYPERLINKED SEARCH INTERFACE FOR DISTRIBUTED DATABASE

BACKGROUND OF THE INVENTION

This invention relates generally to retrieval and presentation of data from a distributed database such as the Internet. More particularly, it relates to creating hyperlinks originating from linked and unlinked elements of a web page on a real time basis.

The World Wide Web is the Internet's multimedia information retrieval system. In the Web environment, client machines effect transactions to Web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. The purpose of the links is to provide the user with more details or access to related information. In the Internet paradigm, a network path to a server is identified by a so-called Uniform Resource Locator (URL) having a special syntax for defining a network connection. Use of an HTML-compatible browser, e.g., Netscape Navigator or Microsoft Internet Explorer, at a client machine involves specification of a link via the URL. In response, the client makes a request to the server, or "Web site", identified in the link and, in return, receives in return a document or other object formatted according to HTML.

However, despite the wealth of information available to the user on the Internet, the user is nonetheless dependent on the web page writer's choice of information and particularly on his choice of links between different web pages. It is impossible for a web designer to predict the desires of every user. It is actually doubtful that the user himself can predict his needs until confronted by information at a given moment in time. Furthermore, the desires of the user may not coincide with those of the web designer in that the web designer may only wish the user to consider certain information, e.g., his company's products. In many web sites, the web pages are dynamically generated, making it impossible for the web designer to manually insert hyperlinks for all of the desired pages.

One means for the user to find the information which he seeks in the Internet are the many search engines currently available, e.g., AltaVista, Yahoo, Lycos, HotBot and so forth. However, use of the search engines requires manual entry of the correct search terms and possibly difficult Boolean operations. It also requires the user leaving the task, i.e. page, at hand for traversal to the search engine of his choice. Multiple operations must be accomplished, possibly opening new browser windows. In general, there is a quite a bit of manual work for the user.

From the user standpoint, it would be desirable to be able to adapt the existing web pages and link structure to fit his needs in a real time manner. From the standpoint of the web designer, rather than forcing the user to go to other web sites for their services and information, it would be preferred that the user would remain at, or at least improve the chances return to, his web site.

This invention provides one solution to these problems.

SUMMARY OF THE INVENTION

It is one object of the invention to create real time links to new or existing web pages on unlinked or unlinked elements in a web page.

It is another object of the invention to allow the user access to desired information in the Internet.

It is another object of the invention to facilitate the user's return to a web site after traversal via a real time link.

It is another object in the information to improve the ease of performing a search for information in the Internet.

These and other objects are accomplished by real time creation of new hyperlinks in a hyperlinked database. Responsive to user input, a word or other element is selected in a first page of the hyperlinked database. The selected word is used as part of a search query to a selected search engine. The search results are received from the selected search engine and presented in a second page to a user. In one preferred embodiment, first and second pages are web pages presented by a browser and the selected search engine is an Internet search engine native to a different page than the server from which the first page originates.

As the invention can be used to create new links for elements which have preexisting hyperlinks defined, a test can be performed to determine whether the selected word is associated with a preexisting hyperlink. In the absence of a designated hyperlink, the mechanism of the present invention is initiated, i.e. sending a search query including the selected word to a selected search engine. If the element is the origin of an already designated link, a test can be performed to determine whether the selection was a normal selection event or a special selection event associated with the present invention.

BRIEF DESCRIPTION OF THE DRAWINGS

For a more complete understanding of the present invention and the advantages thereof, reference should be made to the following Detailed Description of the Preferred Embodiment taken in connection with the accompanying drawings in which.

DETAILED DESCRIPTION OF THE DRAWINGS

A typical web site comprises a plurality of web pages which are typically written a markup language such as HTML or XML. Each of these pages are linked to other pages by means of hyperlinks created by the web designer or programmatically created by programs linked to the page by the web designer in response to certain client specific data. Different links are created in the page in response to different client specific such as IP address or browser capability, e.g., to give a client browser from a specific location a particular advertisement in the transmitted web page. The present invention allows users to create new links to preexisting pages and new pages which present information tailored for the user's current needs. The links are generally created at unlinked elements in the web page. However, in one embodiment of the invention, where a different selection technique is used to select and traverse newly created links as opposed to that used for the preexisting links, linked elements can be used as the origin of new links. For example, rather than the single click of the left mouse button as is typically used for traversing a link in current browsers, a drag operation highlighting one or more words in the text followed by a click on a button in a presented form or selection of a menu item in a pop-up menu could be used to create new links. Those skilled in the art would recognize that many other user input combinations could be used. In another embodiment, selection of unlinked words automatically invokes the method of the present invention; selection of linked words invokes the preexisting hyperlink.

In another sense, the invention is an improved search interface for the Internet. Rather than being required to enter a new URL and therefore web context, manually enter in search terms and await the result, the user can select text within the page itself to initiate the search. Optionally, these results are presented in the same web context as the original page and so appear to originate at the same server. In one preferred embodiment, the search results are placed in a new browser window at a size which does not cover the page from which the search originated, the search results can be easily compared to the original page. Returning to the original page is easily accomplished by clicking on the original page window to bring it to the foreground.

While the invention is primarily described in terms of a hyperlink originating from a selected portion of text, portions of an image or the image itself could be used to create a new hyperlink. For example, a portion of an image containing text can be selected, the text recognized using OCR and the recognized text used to initiate the search. For another example, search engines which search for similar images to a selected image exist and can be called by the present invention.

Figure 1A:
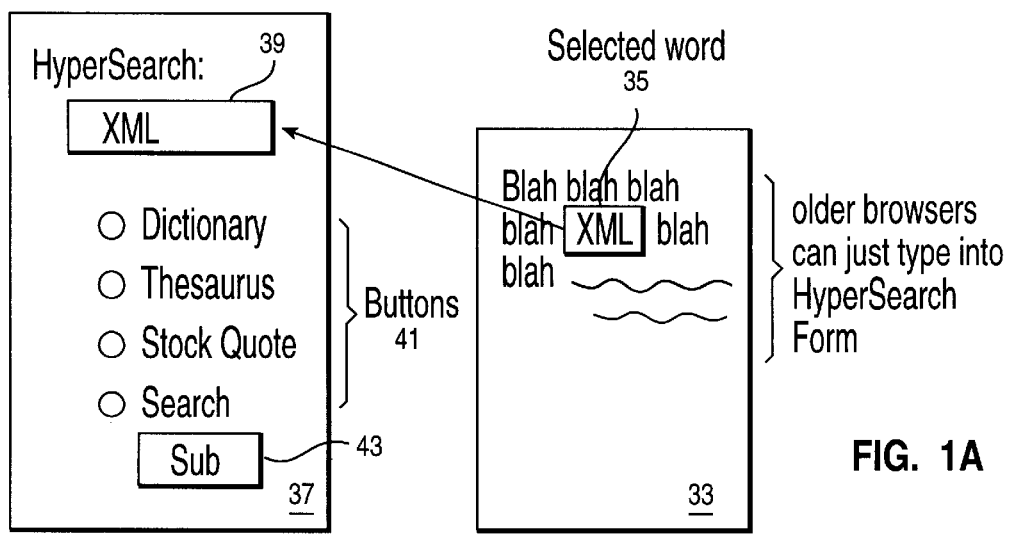
FIGS. 1A and 1B illustrate sample user interfaces for the present invention.
Figure 1B:
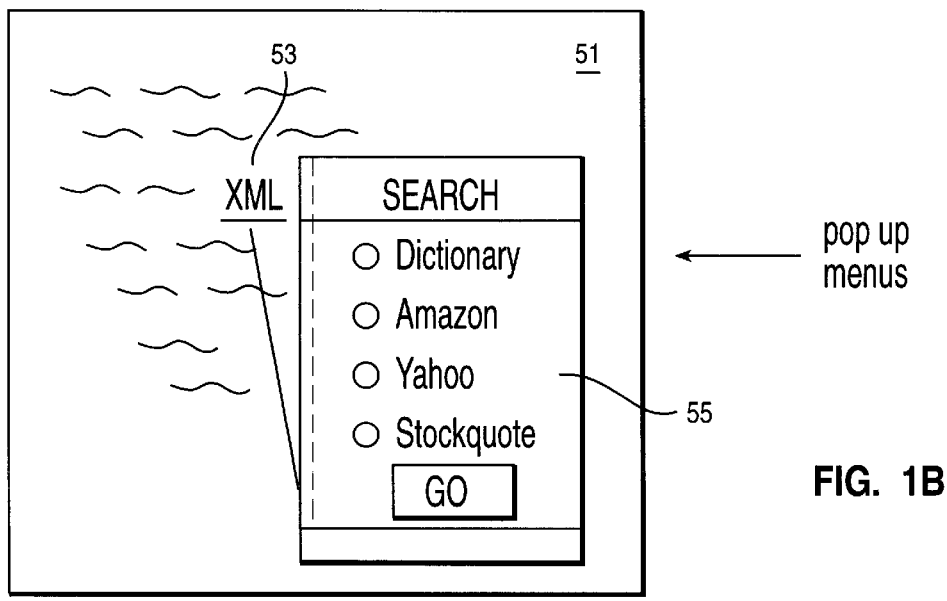

FIGS. 1A and 1B show other aspects of the invention. Responsive to selection of a web page element such as text, a new panel appears. If the invention were implemented as an additional feature to an existing browser, for example, as a plug-in or Java applet, the interface might resemble FIG. 1A. As shown in the figure, in web page 33, the word XML 35 has been selected and highlighted. A panel 37 is presented containing a search form with a field 39 for entry of the selected word as well as a set of buttons 41 to select one or more types of search engines. This illustrates the fact that the user can select one or more types of search engines to carry out the search. The figure lists different types of searches, i.e. dictionary, thesaurus, and stock quote, than the typical general purpose search engines. However, the panel might alternatively list a set of general purpose search engines, allowing the user to select one or more of his favorite search engines for the selected term. Once finished, the form might be submitted by clicking on a button 43. The panel 37 can be presented as an overlaying, adjacent or completely obscuring window with respect to web page 33 depending on the implementation of the interface.

The dictionary or stock quote options listed in the form are examples of using the invention to link to specific databases. There exist web sites, e.g., dictionary.com which provide Internet access to an online dictionary through the use of an HTML form on a web page. By using the invention to build a form, the selected dictionary can be searched. Similarly, there exist a number of Internet sources for real time stock quotes, e.g., CNNfn.com. Using the company's name or symbol, the appropriate HTTP request can be built based on the selected term. The invention can be further extended to linking to more specific, even custom searching of documents. In general, the invention provides a means for a user to gain near instant access to further details or information concerning a selected term or element without forethought by the designer of the web page.

FIG. 1B shows the invention as integrated into the browser. In this example, the user has again selected the word XML 53 on the web page 51. In this user interface, a pop-up menu 55 is shown. By selecting one or more items on the pop-up menu, the search(es) can be initiated. This figure also shows that a more focused search, in this case for books at a particular web site, e.g., www.amazon.com, can be initiated by the present invention from any word in any web page.

Figure 2:
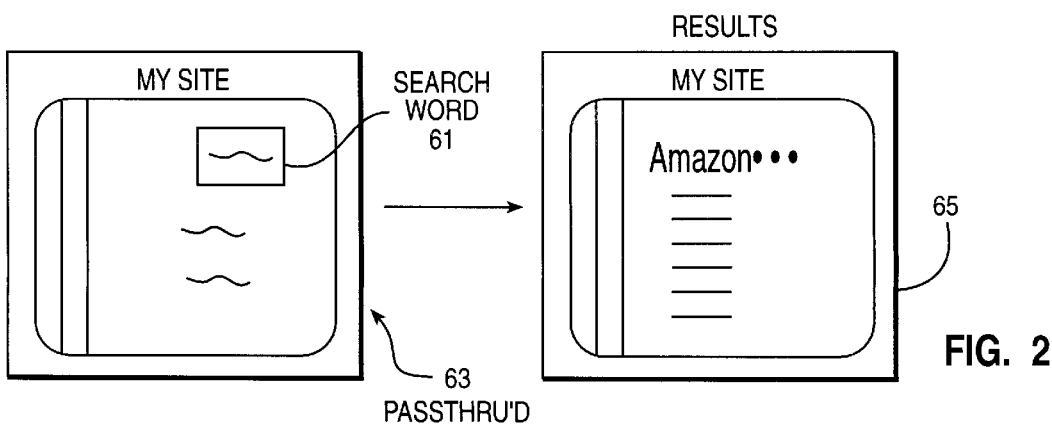
FIG. 2 illustrates an embodiment of the invention wherein the newly created page is formatted to have the same look and feel as the web page from which the new hyperlink was created.

FIG. 2 shows the user interface in one preferred embodiment of the invention. In this embodiment, the word 61 is selected from a web page 63 at a hosting web server. The hosting web server acting as a proxy server to the requesting client browser makes the search request to a content provider web server, in the figure an Internet commercial site. The hosting server "recasts" the information to a "native" format so that it appears as though the search results originated at the hosting site. The hosting server extracts the relevant set of content elements from the web page from the web content provider site and plugs the elements into a template having the format, font and navigational element of the hosting site to create the "recast page" 65. Thus, the invention can be implemented as proxy server as well as the modifications to the client browser.

Figure 3:
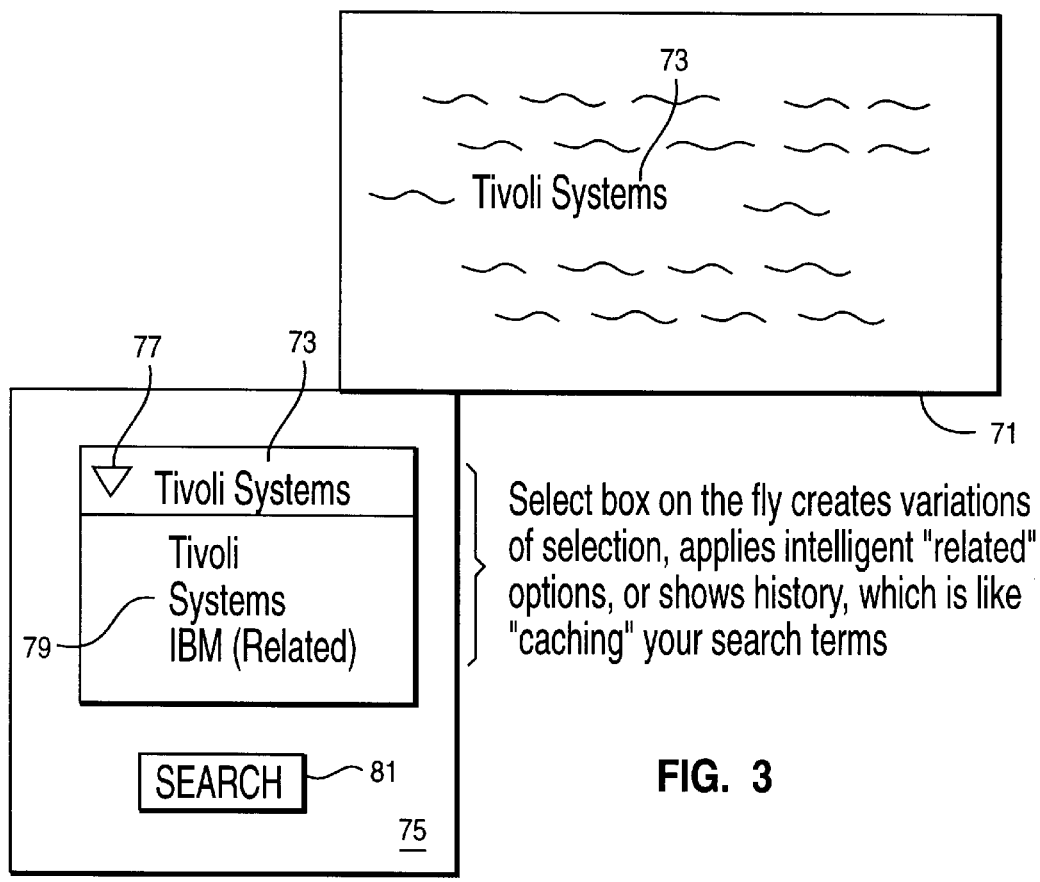
FIG. 3 shows a pull down box in the user interface to select or otherwise refine search terms.

FIG. 3 shows that the search initiated by the browser can be modified after the initial selection of the text in the web page. In web page 71, the phrase "Tivoli Systems" 73 is selected by the user. The pop-up dialog box 75 contains the search term 73 in a field 75 with an arrow 77 beside it. The arrow 77 indicates that there are alternative search terms available. If the user activates the arrow 77, a pull-down 79 is presented containing the alternative search terms is presented. In the figure, "Tivoli", "Systems" and "IBM" are presented as alternatives. One or more of the alternative search terms in addition to or instead of the originally selected search term can be selected prior to activation of the search button 81. This illustrates that the search can be expanded to related search terms; Tivoli Systems is a subsidiary of the IBM Corporation. This can be accomplished by reference to a general purpose or specialized thesaurus. Using related search terms can vastly improve and expand the scope of a search. The figure also illustrates that the user may have trouble selecting exactly the right phrase by dragging through the text. In the instant example, perhaps the user only wished to select "Tivoli", but not "Systems".

Not illustrated, but another alternative embodiment of the invention, is the use of Booleans to modify the search strategy. In the figure, after the arrow 77 is activated, the alternatives listed could be ("Tivoli" AND "Systems"), ("Tivoli" OR "Systems") and ("Tivoli" SS "Systems"), where "SS" means that "Tivoli" and "Systems" occur in the same sentence. An alternative interface would present the selected words spaced with pull-downs including the possible Booleans. Thus, more complicated searches can be selected from the web page while minimizing the amount of typing by the user.

Figure 4:
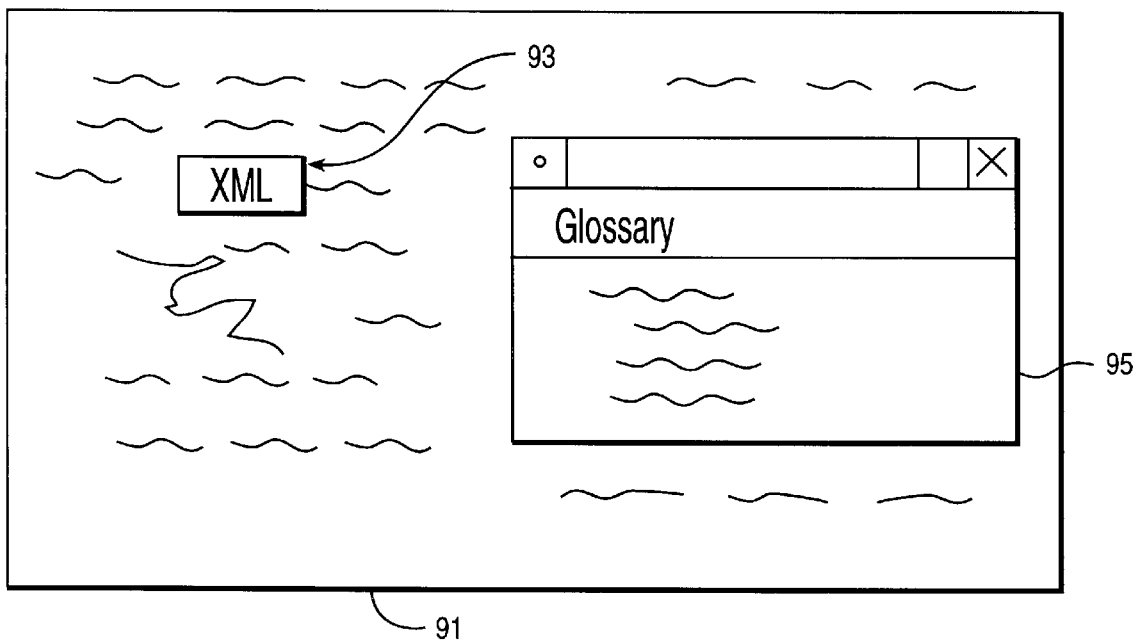
FIG. 4 shows the user interface of another embodiment of the invention.

As shown in FIG. 4, the search can be automatically executed in response to selection of the search text in the web page 91. As shown, the term "XML" is selected by the user. In response, a floating pop-up window 95 is displayed over a non critical portion of the underlying web page 91. Here a search of a glossary of terms is automatically linked to the selection by the creator of the web page. The presentation mechanism can be programmed to present the pop-up window proximate to, but not on top of, the selected text. While the figure shows an automatic search programmed by the web page designer, other search mechanisms without an intermediate panel are encompassed by the invention. Data can be entered into a user profile for the search mechanism, e.g., selecting an AltaVista search. Responsive to the selection of text in the web page, the search selected in the user profile is automatically executed and the results presented in a new web page. If the user wishes to change the default search engine or specify that the search should be conducted by multiple search engines, he may retrieve the user profile and edit the saved parameters. An expert user could pick an "advanced properties" dialog selection whereupon additional search engines could be added programmatically.

Typically, the web page presented to the user is a newly generated web page tailored to the needs of the user. However, in some circumstances it is possible to anticipate common needs of users and prepare a web page to meet those needs. When the selection of one of a group of terms is selected, the prepared page can be presented, even though a hyperlink does not exist between the word selected and the prepared page.

Figure 5:
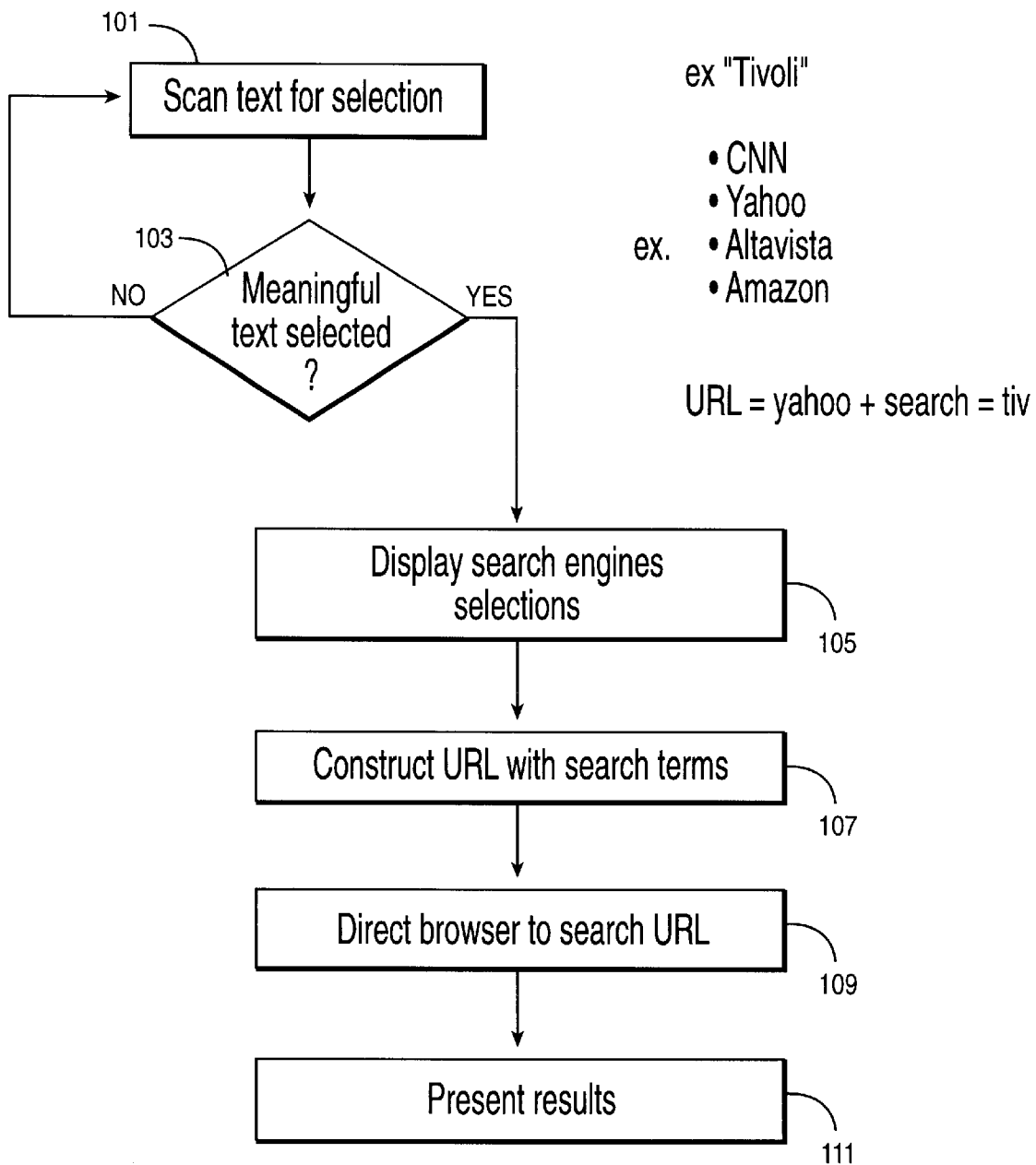
FIG. 5 shows the general flow diagram for the invention.

In FIG. 5, a general flow diagram for the invention is shown. Step 101 is continually performed by the browser as it scans the text for a selection event which indicates that the user wants to invoke the mechanism of the present invention. In step 103, a test to determine whether meaningful text is selected. A meaningful selection event is needed to initiate the search process. In one preferred embodiment, the selected elements, generally shown to the user as reverse emphasized or highlighted text, are scanned and loaded into a "selected text" buffer. When the buffer's contents change, a selection has occurred. If the selection contains something other than punctuation or spacing, it is "meaningful". The selected text is then cleaned up, removing the leading and trailing spaces, and so forth. Common words such as "the", "a" and "that" can be removed as they are unlikely to be good search terms. This can be done by referring to a list of common words.

In step 105, a panel displaying the alternative search engines available is presented. The panel can be a window which part of the browser program and presented by the operating system according to graphics calls or the result of the browser parsing an HTML file from the server depending upon the particular implementation of the invention. The search engines listed might be those from the CNN, Yahoo, AltaVista and Amazon web sites. Once the destination search engine is determined, the destination URL for the HTTP request is built by encoding the search term(s) into a request appropriate for the search engine at the web content provider site. In one embodiment of the invention, the request emulates a search initiated through a form on the host engine's web site. In step 107, an HTTP request is constructed containing the URL of the requested search engine and the selected search term. To encode the URL and search term may vary from web site to web site, but is performed according to well known Internet protocols in the preferred embodiment. The format is compatible with browsers and ensures special characters such as "%", "*", and so forth do not corrupt the data stream or confuse the search terms in the submitted request. The search term is typically included into a URL of the HTTP request which represents a form submission. The syntax is similar to the HTTP request made by the browser when a typical form is filled out by the user on the web. That is, the values of the form fields are encoded at the end of a URL in the request, and delivered to a program on the server. The server program extracts the data from the URL and acts on it appropriately. Rather than requiring the user to fill out a form at a search site, the present invention uses the selected content from the web page and uses them as search terms for the HTTP request. For example, searching for the search term "XML" on Yahoo would create the HTTP request: http://search.yahoo.com/bin/search?p=xml. A search for "XML" on the AltaVista web site would create the request: http://www.altavista.com/bin/query=xml. Other requests containing more search terms will be more complicated, requiring more input parameters, Booleans and so forth. Where multiple search engines are selected by the user, multiple HTTP requests will be generated.

In step 109, the browser request is directed to the search URL. In some embodiments, this action is taken by a hosting server which acts as an intermediary between the client and web content provider. Finally, in step 111, the results of the search operation are presented in a new web page to the user.

Now that the general outlines of the invention have been discussed some more specific implementation details for certain preferred embodiments are described below.

Figure 6:
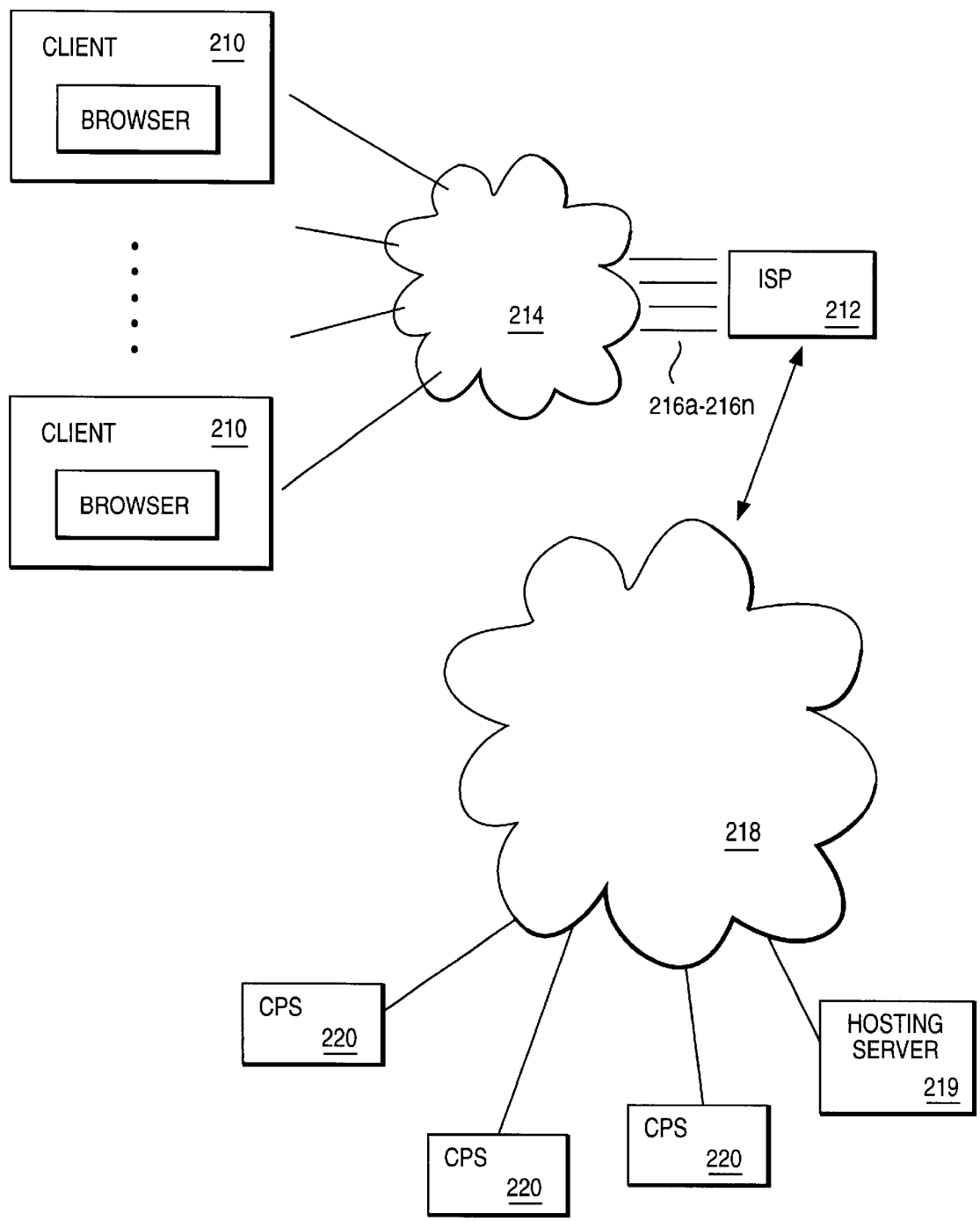
FIG. 6 is a representative system in which the present invention is implemented.

A representative system in which the present invention is implemented is illustrated in FIG. 6. A plurality of Internet client machines 210 are connectable to a computer network Internet Service Provider (ISP) 212 via a network such as a dialup telephone network 214. As is well known, the dialup telephone network usually has a given, limited number of connections 216a–216n. ISP 212 interfaces the client machines 210 to the remainder of the network 218, which includes the hosting server 219 and a plurality of web content provider server machines 220.

A client machine 210 typically includes a suite of known Internet tools, including a Web browser 213, to access the servers of the network and thus obtain certain services. These services include one-to-one messaging (e-mail), one-to-many messaging (bulletin board), on-line chat, file transfer and browsing. Various known Internet protocols are used for these services. Thus, for example, browsing is effected using the Hypertext Transfer Protocol (HTTP), which provides users access to multimedia files using Hypertext Markup Language (HTML). The collection of servers that use HTTP comprise the World Wide Web, which is the Internet's multimedia information retrieval system.

Figure 7:
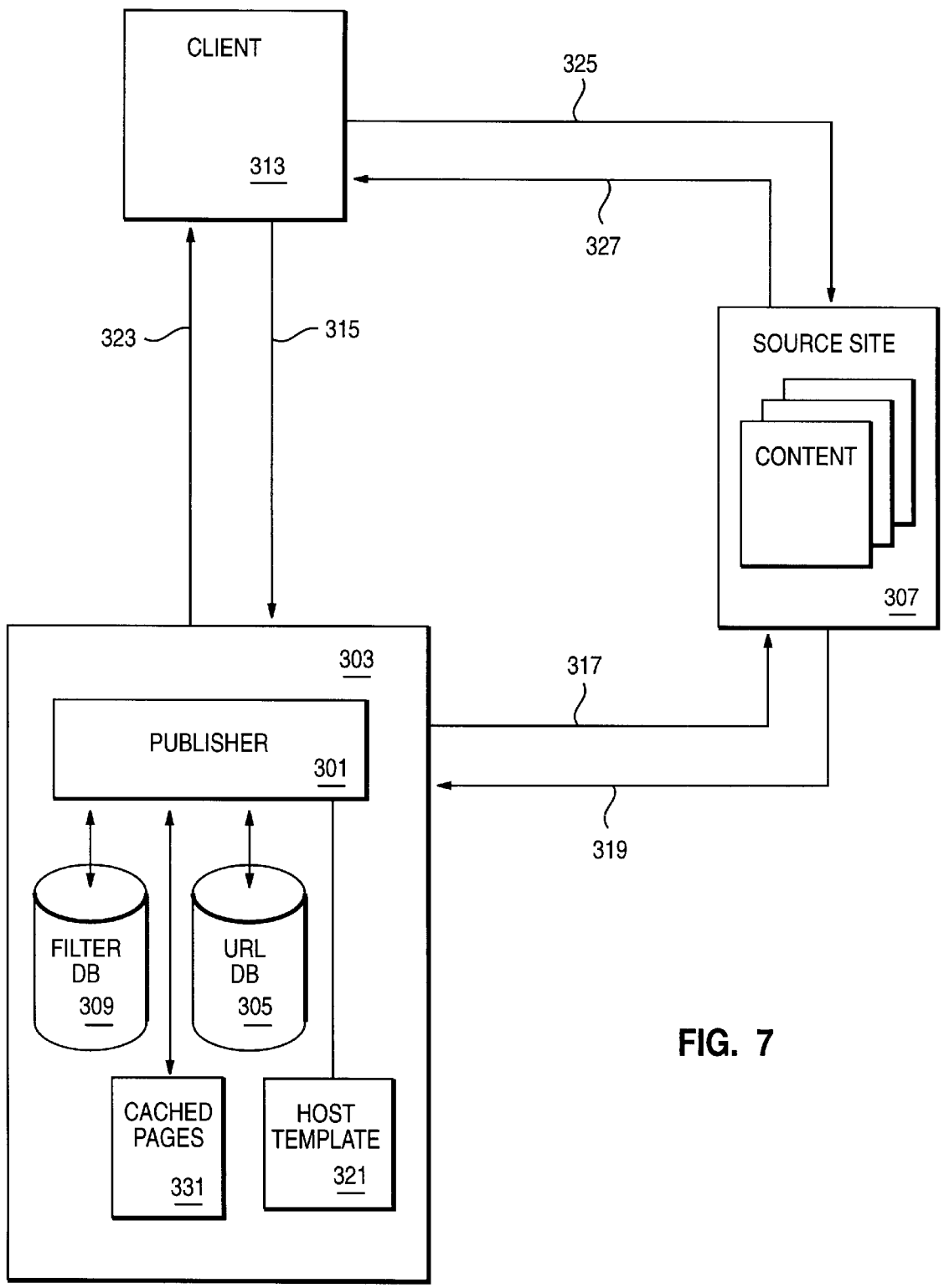
FIG. 7 is a simplified block diagram of a requesting client, hosting server and plurality of content provider servers which illustrates an overview of the process of the present invention.

As shown in FIG. 7, one embodiment of the invention uses a method and system for extracting Web-based content from content provider or source Web sites for use by the hosting or "pass-through" Web site. The pass through technology is discussed in greater detail in Ser. No. 09/113,678, now U.S. Pat. No. 6,128,655 entitled "Distribution Mechanism For Filtering, Formatting and Reuse of Web Based Content" which is hereby incorporated by reference. In today's web technology, the web page is typically an HTML file with references to the component .wav, .mov, .gif and JPEG files which together make up the web page as perceived by the user. Secondary page components such as cascading style sheets and Java applets can also be accommodated by the pass through mechanism. The list above is merely exemplary; any component on a web page can be extracted and recast into the hosting site context by the pass through mechanism. In this invention, typically, the extracted components will be textual in nature.

In this configuration, the pass through publisher 301 at the hosting site 303 is provided with the URLs 305 for the desired content provider web servers 307 and a set of filters 309 for the content publisher's document templates 311. For ease in illustration, a single client 313 and a single web content server 307 are depicted. However, the reader should understand that a plurality of clients and web content servers are typically interconnected through the agency of the hosting site. Upon a search request 315 from a client 313 for a given search term, typically made through an HTTP request from the resident browser, the process for providing a page containing the search results using the pass through mechanism begins. The hosting site makes a search request 317 to the search engine at the web content server 307 on behalf of the client, formatting the HTTP request as needed for the particular search engine, search terms selected by the user and user profile. The page is containing the search results is returned 319 to the hosting server 301.

Next, the pass through publisher 301 retrieves the filter definitions and policies from the filter database 309 for this particular content provider web site. Using the filters and the retrieved HTML page, the pass through publisher 301 parses the HTML source for desired components of the page. In this invention, these are primarily the actual text containing the search results, however, other elements are potentially incorporated into the new page. The search results are then recast into a new web page by means of an HTML template 321 that matches the look and feel of the hosting Web site. The new page includes the graphics of the hosting provider as well as the navigational features of the hosting site. This page is then sent 323 to the client 313 for presentation by the browser.

The recast page displayed by the browser can preserve other elements of the search page returned by the search engine. In fact, this may be required by the contract which the operators of the hosting server have with those of the search site. For example, the ad banner, the logo banner and some, but not usually all of the links to other content provider web pages could be preserved in the recast web page according to the policy for the web content provider. Since these links may be important to the web content provider to generate additional hits for other advertising revenue, the provider may wish to institute a policy that at least some of these links will the preserved in the recast page.

Figure 8:
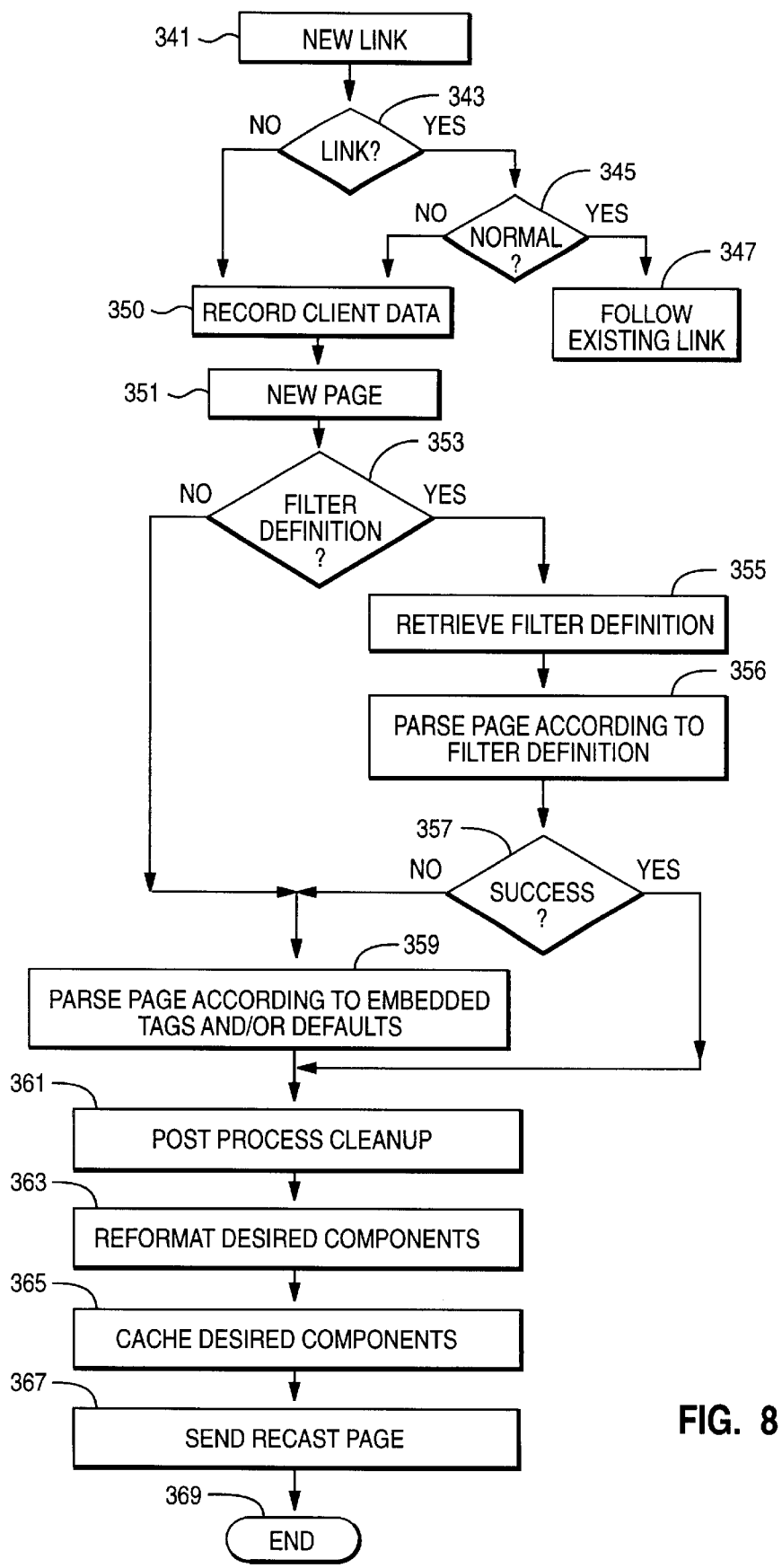
FIG. 8 is a more detailed flowchart of a preferred method of the processes which occur at the hosting server.

In FIG. 8, the process for parsing and reusing web content by the pass through publisher is shown. When a client requests a new hyperlink from the pass through publisher at the hosting web site, step 341, according to the invention by selecting nonlinked or linked elements of the presently displayed page. If the element is a linked element, step 343, a test, step 347, must be performed to determine whether the selection was a normal selection, in which case the preexisting hyperlink is followed, step 349, or the selection was that of the present invention. Depending on the implementation of the invention, the select on of the present invention could be a different set of user steps or a different mode of the browser. In step 350, the requesting web client information is recorded, and a request is made by the hosting web site to the content provider's web server on behalf of the requesting web client. The HTTP request to the web content provider server is similar to that which the requesting client could make to the content provider site directly, except with the hosting site as the originator.

For the process depicted in FIG. 7, new content has been retrieved from the web content provider web server, step 351. Once the document content has been retrieved from the host provider, the filter database is searched for the appropriate filter definition, step 353, i.e. the filter definition kept for the web content provider. The information in the filter definition will help the pass through publisher parse the document structure of the web page, extracting the desired information. In step 357, a test is performed to determine whether the parsing was a success.

If a filter definition for the page or web content provider is not found, or the first attempt using the associated filter definition was not a success, the pass through publisher can fall back to a series of default filters which will assist in parsing the data, step 359. The hosting site will still be able to present the reformatted content, however, the process will not be as efficient as through an existing filter definition. This "best guess" approach utilizes several methods, including looking for common references to advertising engines, etc. As discussed below, the publisher can also look for a set of embedded tags indicating the desired content. Any document that a filter can not be found for can be logged, allowing staff to later create appropriate filter definitions. In practice, however, hosting sites employing the pass through technique will be able to define templates appropriate to all "rehosted" content. Most content provider sites employ a standard look and feel in their documents, allowing for filters that are appropriate for large numbers of documents found on a particular web site, if not every document on the entire provider web site.

These excerpted components are then run through the pass-through publisher's "post-processing" system to assure that they do not contain "dangerous" formatting code fragments that could adversely effect the hosting web site, step 361. For example, when articles are extracted from within a TABLE structure, HTML TABLE fragments could be left in the filtered HTML that could destroy formatting on the hosting web site. As another example, interactive or browser dependent scripting code could be found in the filtered HTML that may not make sense in the document's new context. The post filtering tasks should also include fixing any relative URLs embedded in the original web page to preserve their original function. Optionally, this can be accomplished by pointing the URLs to the hosting site for handling. For example, many documents are split into several pages by the web publisher. The link to the next part of the article can be translated to a hosting site link so that the next part is automatically served in the hosting site's context. The relative link could also be translated to an absolute link so that it will still lead to the content provider server even when selected in the recast page. As would be readily understood by those skilled in the art, these post filtering tasks could easily be performed by one of the filters, however, the applicants have found it to be convenient to separate the tasks thus simplifying the construction of the filter definitions.

The component HTML file, once extracted, separated, and post filtered is then reformatted into a new document in the style and context of the hosting web site, step 363. This is done by another component of the pass through publisher, a web publishing application that creates a "dynamic publishing template". The web publisher injects the excerpted content, titles, copyright statements and Logos as received from the post filtering process. In step 365, the desired components are cached, which may include components useful in determining the version of a web page, but are not used in the recast page. In step 367, the recast page is sent to the requesting client. The process ends, step 369. Once presented by the requesting browser, the content of the hosting web site appears seamless to the user, although it may originate at a plurality of web content provider sites as well as the hosting site itself.

Figure 9:
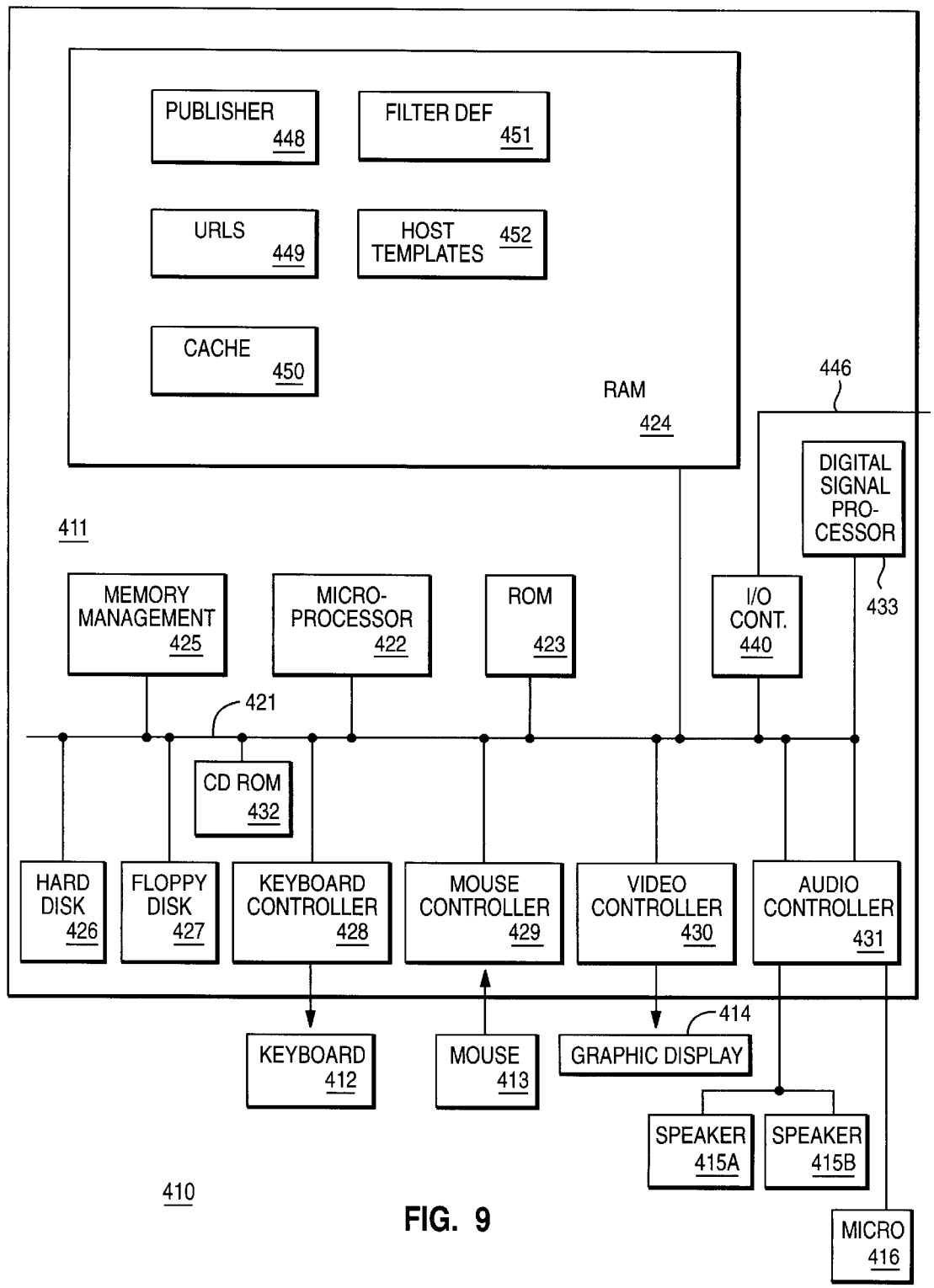
FIG. 9 shows a computer system in which the present invention is implemented.

For sake of a complete description, a discussion of the general purpose computers in which the invention may be implemented follows. Of course, as is also mentioned, specialized hardware as well as firmware and software implementations of the invention are also possible. The client machine may be a personal computer such as a desktop of notebook computer, e.g., an IBM or an IBM-compatible machine running under the OS/2® operating system, an IBM ThinkPad® machine, or some other Intel x86 or Pentium®-based computer running Windows '95 (or the like) operating system. Of course, the invention may be run on a variety of computers or collection of computers under a number of different operating systems. The computers on which the client software and the hosting and content provider web site reside could be, for example, a personal computer, a mini computer, mainframe computer or a hand held computer. Although the specific choice of computer is limited only by processor speed and disk storage requirements it is typical that the client computer will be somewhat "lighter weight" than the web server computers. For example, computers in the IBM PC series of computers could be used a clients in the present invention. One operating system which an IBM personal computer may run is IBM's OS/2 Warp 4.0. For the web servers, the computer system might be in the IBM RISC System/6000(™) line of computers which run on the AIX(™) operating system In FIG. 9, a computer 410, comprising a system unit 411, a keyboard 412, a mouse 413 and a display 414 are depicted in block diagram form. The system unit 411 includes a system bus or plurality of system buses 421 to which various components are coupled and by which communication between the various components is accomplished. The microprocessor 422 is connected to the system bus 421 and is sup ported by read only memory (ROM) 423 and random access memory (RAM) 424 also connected to system bus 421. A microprocessor in the IBM PC series of computers is one of the Intel family of microprocessors including the 386, 486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM might be used by the present invention. Other RISC chips made by Hewlett Packard, Sun, Motorola and others may be used in the specific computer.

The ROM 423 contains among other code the Basic Input-Output system (BIOS) which controls basic hardware operations such as the interaction of the processor with the disk drives and the keyboard. The RAM 424 is the main memory into which the operating system and application programs are loaded. The memory management chip 725 is connected to the system bus 421 and controls direct memory access operations including, passing data between the RAM 424 and hard disk drive 426 and floppy disk drive 427. The CD ROM drive 432 also coupled to the system bus 421 is used to store a large program or amount of data, e.g., a multimed a program or presentation.

Also connected to this system bus 421 are various I/O controllers: The keyboard controller 428, the mouse controller 429, the video controller 430, and the audio controller 431. As might be expected, the keyboard controller 428 provides the hardware interface for the keyboard 412, the mouse controller 429 provides the hardware interface for mouse 413, the video controller 430 is the hardware interface for the display 414, and the audio controller 431 is the hardware interface for the speakers 415. An I/O controller 440 such as a Token Ring Adapter enables communication over a network 446 to other similarly configured data processing systems.

One of the preferred implementations of the invention is as sets of instructions 448–452 resident in the random access memory 424 of one or more computer systems configured generally as described above. Until required by the computer system, the set of instructions may be stored in another, computer readable memory, for example, in the hard disk drive 426, or in a removable memory such as an optical disk for eventual use in the CD-ROM 432 or in a floppy disk for eventual use in the floppy disk drive 427. Further, the set of instructions can be stored in the memory of another computer and transmitted in a transmission means such as a local area network or a wide area network such as the Internet when desired by the user. On skilled in the art knows that storage or transmission of the computer program product changes the medium electrically, magnetically, or chemically so that the medium carries computer readable information.

Further, the invention is often described in terms that could be associated with a human operator. While the operations performed may be in response to user input, no action by a human operator is desirable in any of the operations described herein which form part of the present invention; the operations are machine operations processing electrical signals to generate other electrical signals.

It is important to note that the source search engine does not require any special modifications. The invention will work with the existing Internet structure using a properly designed client browser or proxy server. The invention's use of standard HTTP requests to emulate the submission of a form, minimizes the user's effort, yet does not require any intervention on the part of the search server's operators.

The invention can be used for a wide variety of applications. As mentioned above, the invention can be used to automatically link to one or more general or specialized search engines in the Internet, in one sense reducing the burdens on the web designer to think of the needs of each user in advance. The invention may also be utilized by the user to create links which the web designer would never create. For example, suppose that a user was contemplating the purchase of a new computer on the www.ibm.com/Aptiva web site. With the selection of a few selected terms such as "17 inch monitor", "400 MHz" and "8 GB", the user could quickly review some competitive offerings without leaving the original web site. Note that this implementation of the invention would require multiple selection or editting of the search terms in all probability.

As mentioned above, selection of more than one search engine is possible through the invention. If results were retreived from more than search engine, these results would need to appended to each other in the new web page. In the case of the pass through embodiment, the template on the hosting server would contain the appropriate formatting information to create a pleasing appearance.

As used herein, "Web client" or client browser should be broadly construed to mean any computer or component thereof directly or indirectly connected or connectable in any known or later-developed manner to a computer network, such as the Internet. The term "Web server" should also be broadly construed to mean a computer, computer platform, an adjunct to a computer or platform, or any component thereof. Of course, a "client" should be broadly construed to mean one who requests or gets the file, and "server" is the entity which downloads the file. Moreover, although the present invention is described in the context of the Hypertext Markup Language (HTML), those of ordinary skill in the art will appreciate that the invention is applicable to alternative markup languages including, without limitation, SGML (Standard Generalized Markup Language), dynamic HTML and XML (Extended Markup Language).

Moreover, while the preferred embodiment is illustrated in the context of a dialup network and the Internet, this is not a limitation of the present invention. The invention can also be implemented in an Internet environment where a large organization may have several content provider units which provide content for content using units which target different customer segments and have different trade identities. Thus, while the content using units may utilize much of the same information, each will want to recast the information in a different look and feel to project their own trade dress.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

We claim:

1. A method for creating hyperlinks in a hyperlinked database, comprising the steps of:

presenting a panel for creating a user profile for searching on a selected, non-hyperlinked word, wherein a default search engine can be selected by a user;

responsive to user input, setting a selected search engine as the default search engine;

responsive to user input, selecting a word in a first page;

using the selected word to construct a search query to the default search engine;

sending the constructed search query to the default search engine;

receiving search results from the selected search engine; and using the selected word as a hyperlink to a second page, wherein the search results are presented in the second page to the user.

2. The method as recited in claim 1, wherein the first and second pages are web pages presented by a browser.

3. The method as recited in claim 2, further comprising the steps of:

determining whether the selected word is associated with a preexisting hyperlink;

in the absence of a designated hyperlink, sending a search query including the selected word to a selected search engine.

4. The method as recited in claim 3, wherein the first web page is served from a hosting web site, and the method further comprises the steps of:

retrieving the results from a search engine from a content provider web site;

extracting desired content elements from the results;

inserting the desired content elements in a new web page formatted according to a hosting site format; and sending the new web page to the browser;

wherein when the new page is presented by the browser, all content elements appear native to the hosting site.

5. The method as recited in claim 1, further comprising the step of creating a permanent hyperlink in at least the user's copy of the first page.

6. The method as recited in claim 1, further comprising the steps of:

responsive to selection of a word, presenting a panel containing a list of available search engines; and responsive to selection of at least one of the search engines, sending the search query to the selected search engines.

7. The method as recited in claim 6, wherein a plurality of search engines are selected.

8. The method as recited in claim 1, further comprising the steps of:

responsive to selection of a word, presenting a panel for refining a search query; and refining the search query according to user input to the panel.

9. The method as recited in claim 1, further comprising the steps of:

presenting a user profile panel containing selections relating to formation of a search query;

responsive to user input, creating a user profile for a search process; and responsive to selecting an unlinked word in the page, executing the search process according to the user profile.

10. A system including processor and memory for creating hyperlinks in a hyperlinked database, comprising:

means for presenting a panel for creating a user profile for searching on a selected, non-hyperlinked word, wherein a default search engine can be selected by a user;

means responsive to user input for setting a selected search engine as the default search engine;

means responsive to user input for selecting an element in a first page;

means for using at least a portion of the selected element to construct a search query to the default search engine;

means for sending the constructed search query to the default search engine;

means for receiving search results from the selected search engine; and means for using the selected word as a hyperlink to a second page, wherein the search results are presented in the second page to the user.

11. The system as recited in claim 10, wherein the selected element is text in a first web page.

12. The system as recited in claim 10, wherein the selected element comprises an image.

13. The system as recited in claim 10, wherein the system is a proxy server coupled by means of a network to a client browser.

14. A computer program product in a computer usable medium for creating hyperlinks in a hyperlinked database, comprising:

means for presenting a panel for creating a user profile for searching on a selected, non-hyperlinked element, wherein a default search engine can be selected by a user;

means responsive to user input for setting a selected search engine as the default search engine;

means responsive to user input for selecting an element in a first page;

means for using at least a portion of the selected element to construct a search query to the default search engine;

means for sending the constructed search query to the default search engine;

means for using the selected word as a hyperlink to a second page, wherein the search results are presented in the second page to the user.

* * * * *

UNITED STATES PATENT AND TRADEMARK OFFICE
CERTIFICATE OF CORRECTION

PATENT NO. : 6,338,059 B1
DATED : January 8, 2002
INVENTOR(S) : Fields et al.

It is certified that error appears in the above-identified patent and that said Letters Patent is hereby corrected as shown below:

Column 14,
Line 7, after "engine;" please insert -- means for receiving search results from the selected search engine; and --.

Signed and Sealed this

Third Day of September, 2002

*Attest:*

*Attesting Officer*

JAMES E. ROGAN
*Director of the United States Patent and Trademark Office*